Figure 1:
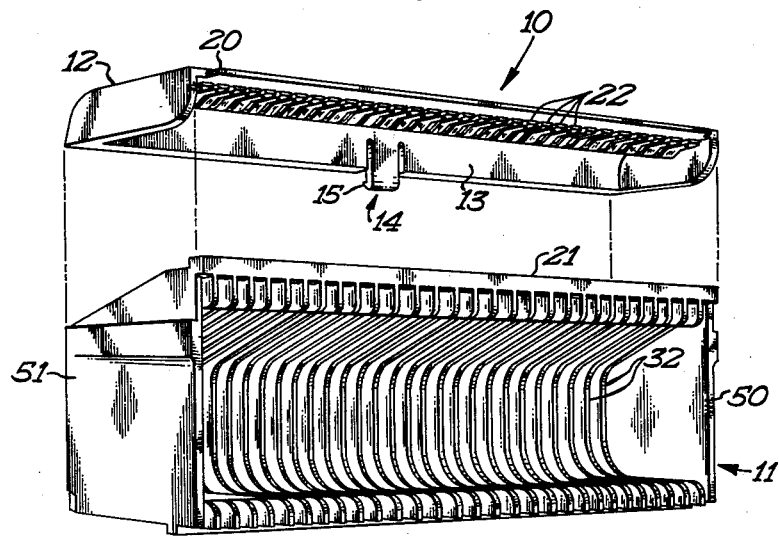

July 24, 1962 W. R. KING 3,045,816
PHOTOGRAPHIC SLIDE TRAY
Filed July 3, 1961

INVENTOR.
WILLIAM R. KING
BY
ATTORNEY

United States Patent Office 3,045,816
Patented July 24, 1962

3,045,816
PHOTOGRAPHIC SLIDE TRAY
William R. King, Denver, Colo., assignor to Minneapolis-Honeywell Regulator Company, Minneapolis, Minn., a corporation of Delaware
Filed July 3, 1961, Ser. No. 121,713
6 Claims. (Cl. 206—73)

The present invention is concerned with an improved photographic slide tray and particularly with a box like slide tray which is constructed and arranged to facilitate slide editing while the slide tray is an position on the slide tray platform of an automatic projector.

The present invention relates to that phase of the photographic art in which automatic projectors are utilized with a slide tray holding a number of photographic transparencies, for example 30 transparencies in a spaced side-by-side relationship, the automatic projector being constructed and arranged to sequentially show these slides, first returning a slide from a projection compartment within the projector to the slide tray, then indexing the slide tray, and then moving a further slide to the projection compartment of the projector where it may be displayed on a screen or the like. Slide trays of this general type are constructed to have separate compartments for each individual slide.

As a further refinement of this type of slide tray, the prior art provides various means for editing these slides while the slide tray is in position on the slide tray receiving platform of the automatic projector. The term "slide editing" refers to the ability of the operator of the projector to remove a desired one or more of the slides from the slide tray to replace the slide with a different one, or to perform a number of possible functions such as merely placing a slide in a proper position to produce an upright view on the screen. It is desirable that the slide tray be constructed and arranged to allow this slide editing to take place while the tray is in position on the projector rather than requiring that the slide tray be completely removed, the editing then takes place, and the slide tray again placed in position on the projector.

The present invention provides an improved photographic slide tray which accomplishes this in a manner to provide ease of manufacture, reliability of operation, and at the same time provide a slide tray which is substantially completely enclosed, except for the open space through which the slides move into the projection compartment of the projector, the slide tray including spring biasing means to prevent accidental dropping of the slides should the slide tray be inverted such that its open face is in a downward direction.

Specifically, the slide tray of the present invention is provided with an open face, as above mentioned. This open face is bordered by a bottom wall with a back wall opposite the open face. The interior edge formed by the back and bottom walls is provided with an interior shoulder such as to space the back edge of the slide from the interior surface of the back wall. Diagonally opposite this shoulder is a small top wall member, the top wall member being of a dimension to overhang the top edge of the slide such that a direct upward movement of the slide, such as produced by inverting the tray, does not allow the slide to accidentally fall out of the tray. However, the operator may lift the slide until the bottom edge clears the shoulder and then move the slide back to engage the interior surface of the back wall, in which position the top edge of the slide clears the top wall member. The slide may then be removed for editing. Furthermore, the tray of the present invention is provided with septum means which are attached to the bottom wall and the back wall members and also to the top wall. Thus, the slides are supported along the bottom, the back, and the top portions thereof by the septum means, these septum means being shaped so as to facilitate ease of placing slides in the tray while editing and also to facilitate ease of molding, it being recognized that these slide trays are generally molded of synthetic resin material of one form or another. Also, the slide tray of the present invention is provided with a removable cover for the top portion thereof. The cover is provided with latch means which engages mating latch means on the back wall and the top wall. Thus, the cover is adapted to provide a completely enclosed slide tray, except for the openface as above mentioned. Thus, the slide tray is relatively dustproof. The interior surface of this cover is provided with spring means including a plurality of fingers, one of which cooperates with each slide compartment formed by the septum means to thereby spring bias the slides and prevent a discharge of the slides should the tray be inadvertently tipped with the open face in a downward direction. This cover is removable by release of the latch means to facilitate the slide editing.

Figure 2:
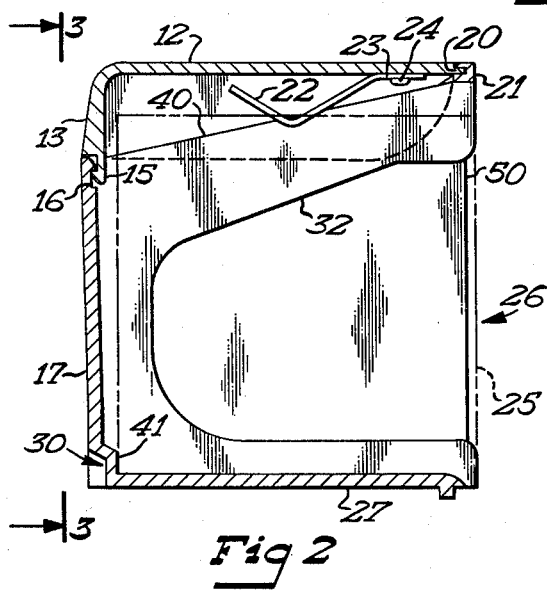
Figure 3:
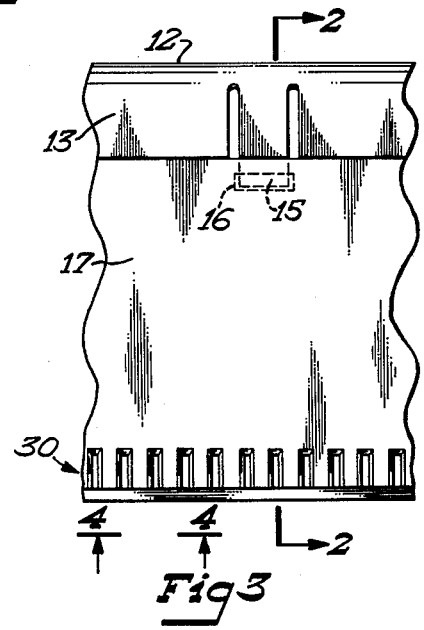
Figure 4:
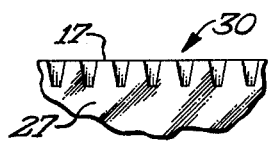

The present invention will be apparent to those skilled in the art upon reference to the following specification, claims, and drawings, of which:

FIGURE 1 is an exploded perspective view of the improved slide tray of my invention, showing the removable cover positioned above the remaining portion of the tray, FIGURE 2 is a section end view of the slide tray with the cover in position, and showing by means of dotted lines a 2¾" slide positioned within the slide tray, FIGURE 3 is a partial view of the back wall of the slide tray showing the cover in position and showing the latching means including resilient finger means, and FIGURE 4 is a bottom view of a portion of the slide tray showing the indexing gear rack.

Referring specifically to FIGURE 1, this figure discloses my improved slide tray with the cover member, designated generally by means of the reference numeral 10, disposed above the remaining portion of the slide tray, identified generally by means of reference numeral 11. The cover member 10 includes a first top portion 12 and a second back portion 13. Back wall portion 13 includes a latching means 14 in the form of a resilient spring finger having a catch 15 adapted to cooperate with a mating catch 16 formed in the back wall 17 of the tray 11. The slide tray of the present invention is more conventionally formed of a molded resin material commonly referred to as a plastic material. Thus, member 14 is resilient and is adapted to be moved inwardly to disengage the latch 15—16 and allow the cover to be removed. The cover is also provided with a lip member 20 adapted to cooperate with a small top wall member 21, as seen in FIGURE 2. Also, cover 10 is provided with resilient spring means in the form of a plurality of spring fingers 22, commonly formed of a phospor bronze or equivalent spring material. In FIGURE 1 springs 22 are seen to cooperate with the slide components within the tray 11, each of these fingers being connected to a common bar member 23 fastened to the inside of the cover by means 24. Thus, when the cover is placed in position on the top of the tray as shown in FIGURE 2, the springs engage the top of the slide to spring bias the slide and prevent the accidental discharge of the slide should the slide tray be inadvertently tipped with the right hand face as seen in FIGURE 2 in a downward direction. In FIGURE 2, a 2¾" slide is shown by means of broken lines 25.

Referring now to slide tray 11, this slide tray is provided with a substantially open face, identified generally by means of reference numeral 26 of FIGURE 2. The slides normally mounted within the slide tray are adapted to be moved out of the tray by way of the open face 26. The slide tray is provided with a bottom wall member 27 adapted to rest on the slide tray receiving platform of an automatic slide projector. Slide tray indexing means 30 comprising a gear rack formed along the corner of the tray formed by the bottom wall 27 and the back wall 17 is adapted to mate with a slide tray indexing mechanism within the automatic projector to thus move the slide tray a distance corresponding to the spacing of adjacent slides within the slide tray. Thus, the automatic projector is operable to return a slide from a projection compartment within the slideprojector to a compartment within the slide tray and to then index or to drive the slide tray to bring a succeeding slide into position such that the succeeding slide is then moved into the projection compartment of the projector. The individual slides within the slide tray are supported by septum means. The septum means of the slide tray includes a plurality of septum means disposed in a bottom and back portion of the slide tray and at the upper corner of the slide tray.

The septum means includes a plurality of septum means, identified generally by means of reference numeral 32. As seen in FIGURE 2, the septum means 32 is fixed to the interior surface of the bottom wall 27 and to the interior surface of the back wall 17 and to the under side of top wall 21. This full septum not only is attached to the interior surfaces of the bottom wall 27 and the back wall 17 but also extends in an upward direction to support the small top wall member 21. Thus, the septum 32 constitutes a plurality of septum means to define slide compartments within the slide tray.

The slide tray of my invention, due to its unique construction, provides a substantially dustproof housing for storing the slides when they are not in use and also provides a means whereby the slides may be conveniently edited while in use. In FIGURE 2, the tray is seen with slide 25 in position and thus it can be seen that the bottom wall, the back wall, and the top wall are completely enclosed, leaving only the open face 26. Thus, with the slides stored in the attitude shown in FIGURE 2, this being the normal position of the slide tray, dust does not settle on the slides. Furthermore, the spring means 22 spring biases the top edge of the slides and should the slide tray be inverted so that the open face 26 faces in a downward direction, the slides do not fall out of the slide tray.

When the slide tray is placed in position on the slide tray receiving platform of an automatic projector, the cover may be removed, leaving the slide tray as shown in FIGURE 1, the cover being positioned above the slide tray as if it were in the process of being removed by the operator. It should be noted that removal of the cover is not necessary and the cover is ordinarily removed only if the operator decides to edit the slides. The editing of the slides can be accomplished while the tray is still in position at the projector. The operator grasps the particular slide which he wishes to edit, it being noted that the top edge of the septum 32 is inclined as is shown at 40 in FIGURE 2 to thus leave the upper left hand corner of the slide exposed. The operator grasps this upper left hand corner of the slide and pulls the slide in a direct upward direction until the upper right hand corner of the slide engages the top wall member 21. The lower left hand corner of the slide has now cleared an extending shoulder 41 which extends along the interior corner of the slide tray, which corner is defined by the bottom wall 27 and the back wall 17. The slide can then be moved back so that its back edge engages the interior surface of the back wall 17. In this attitude, the upper right hand corner of the slide clears the top wall member 21 and the slide may be removed out of the open top of the tray.

The unique construction including the shoulder or ridge 41 prevents accidental discharge of the slides in the event that the cover 10 is removed and the slide tray is then inadvertently tipped so that its upper face is inclined in a downward direction. The slides, with the cover thus removed and with the tray thus inclined, engage the top wall member 21 and the slides are thus prevented from falling out of the open top of the slide tray. If, however, the slides are first moved directly upward to clear shoulder 41 and then moved directly back to engage the interior surface of back wall 17, the slides may be conveniently removed. Thus my slide tray provides a convenient means for editing the slides, the shoulder 41 being provided to prevent inadvertent spilling of the slides out of the slide tray through the top open face.

A further advantage of my construction lies in the manner in which the septum means are constructed. Septums 32, being relatively shallow are easy to mold. My slide tray provides septums 32 which, in cooperation with the solid end walls 50 and 51, support the top wall means 21 at the upper front corner of the slide tray. The septums 32 serve to prevent a tilting of the slides within the slide compartments and accurately support the slides to prevent jamming in the automatic projector with which my slide tray is intended to be used. Furthermore, the septums 32 are convenient to mold. As a result of this over-all construction, I provide a slide tray having a number of functional advantages, which is capable of easy molding.

Other modifications of the present invention will be apparent to those skilled in the art and it is therefore intended that the scope of the present invention be limited solely by the scope of the appended claims.

I claim as my invention:

1. A projector slide tray comprising; an elongated rectangular shaped box having an open face to facilitate movement of photographic slides in and out of the slide tray, a solid bottom wall member having a flat interior surface to support the bottom edge of the slides, a back wall member opposite said open face, an extending shoulder formed on the lower interior side of said back wall member to space the back edge of the slides from the interior surface of said back wall member, a substantially open top face, and a small top wall member located diagonally opposite the edge joining said bottom and said back wall members, the slide tray being constructed and arranged to facilitate editing of the slides such that the lifting of a slide until the bottom edge thereof clears said shoulder allows said slide to be moved toward said back wall member until the upper edge of said slide clears said top wall member and said slide may then be removed from said slide tray out of the open top face thereof.

2. A photographic slide tray for use with an automatic projector and adapted to hold a plurality of individual photographic slides spaced in a side by side relationship, comprising; an elongated rectangular shaped box having an open face to facilitate movement of the slides out of the tray and into the projection compartment of a projector, a bottom wall member adjacent said open face, said bottom wall member having an interior surface to support the bottom edge of the slides, a back wall member opposite said open face, a shoulder formed at the inside edge defined by said bottom wall member and said back wall member, a relatively small top wall member, and means supporting said top wall member diagonally opposite the edge defined by said bottom wall member and said back wall member.

3. A photographic slide tray for use with an automatic projector adapted to hold a plurality of individual photographic slides spaced in a side by side relationship, comprising; an elongated rectangular shaped box having an open face to facilitate movement of the slides out of the tray, a bottom wall member adjacent said open face, said bottom wall member having an interior surface to support the bottom edge of the slides, a back wall member opposite said open face, a shoulder formed at the inside edge defined by said bottom wall member and said back wall member, a relatively small top wall means supporting said top wall diagonally opposite the edge defined by said bottom wall member and said back wall member, and septum means fixed to said bottom wall member, said back wall member, and said top wall member.

4. A projector slide tray comprising; an elongated rectangular shaped box having an open face to facilitate movement of photographic slides in and out of the slide tray, a solid bottom wall member having a flat interior surface to support the bottom edge of the slides, a back wall member opposite said open face, catch means formed at the upper portion of said back wall member, an extending shoulder formed on the lower interior side of said back wall member to space the back edge of the slides from the interior surface of said back wall member, a substantially open top face, a small top wall member located diagonally opposite the edge defined by said bottom and said back wall members, means including septum means joined to said bottom wall member and said back wall member supporting said top wall member, catch means formed on said top wall member, and a cover member engaging the catch means of said top wall member and said back wall member to form an enclosed slide tray.

5. A projector slide tray for use with an automatic projector adapted to hold a plurality of individual photographic slides spaced in a side by side relationship, the slide tray being provided with a removable cover to facilitate editing of the slides, comprising; an elongated rectangular box having an open face to facilitate movement of the slides out of the tray and into the projection compartment of a projector, a bottom wall member adjacent said open face, said bottom wall member having an interior surface to support the bottom edge of the slides, a back wall member opposite said open face, a shoulder formed at the inside edge defined by said bottom wall member and said back wall member, said shoulder functioning to space the back edge of the slides from the interior surface of said back wall member, a substantially open top face, a small top wall member, means including septum means locating said top wall member diagonally opposite the edge defined by said bottom wall member and said back wall member, the slide tray being constructed and arranged to facilitate editing of the slides by the lifting of a slide until the bottom edge thereof clears said shoulder to allow the slide to be moved toward the interior surface of said back wall member until the upper edge of the slide clears the top wall member, whereupon the slide may be removed from the slide tray for editing purposes, and a removable cover to close said open top face.

6. A photographic slide tray for use with an automatic projector adapted to hold a plurality of individual photographic slides spaced in a side by side relationship, the slide tray being constructed and arranged to facilitate slide editing while the slide tray is in operative position on the automatic projector, the slide tray comprising; an elongated rectangular shaped box having an open face to facilitate movement of the slide out of the tray and into the projection compartment of the projector, a bottom wall member adjacent said open face, said bottom wall member having an interior surface to support the bottom edge of the slides, a back wall member opposite said open face, first latch means carried by the upper surface of said back wall member, a shoulder formed at the inside edge of said slide tray which is defined by said bottom wall member and said back wall member, said shoulder functioning to space the back edge of the slides from the interior surface of said back wall member, a relatively small top wall member, end wall means supporting said top wall member diagonally opposite said edge, septum means fixed to said bottom wall member, said back wall member, and said top wall member, the slide tray being constructed and arranged to facilitate editing of the slide such that the lifting of a slide until the bottom edge thereof clears said shoulder allows the slide to be moved toward the interior surface of said back wall member until the upper edge of the slide clears the top wall member whereupon the slide may be removed from the slide tray for editing purposes, second latch means carried by said top wall member, a cover member adapted to engage said first and second latch means to cover the top of the slide tray and spring means mounted on the inside surface of said cover member and having a plurality of spring fingers located in relation to said septum means to spring bias each of the individual slides, said cover member being removable to facilitate slide editing.

No references cited.